No. 756,417. PATENTED APR. 5, 1904.
E. H. SCHWARTZ.
FEED WATER HEATER.
APPLICATION FILED AUG. 3, 1903.
NO MODEL. 2 SHEETS—SHEET 1.
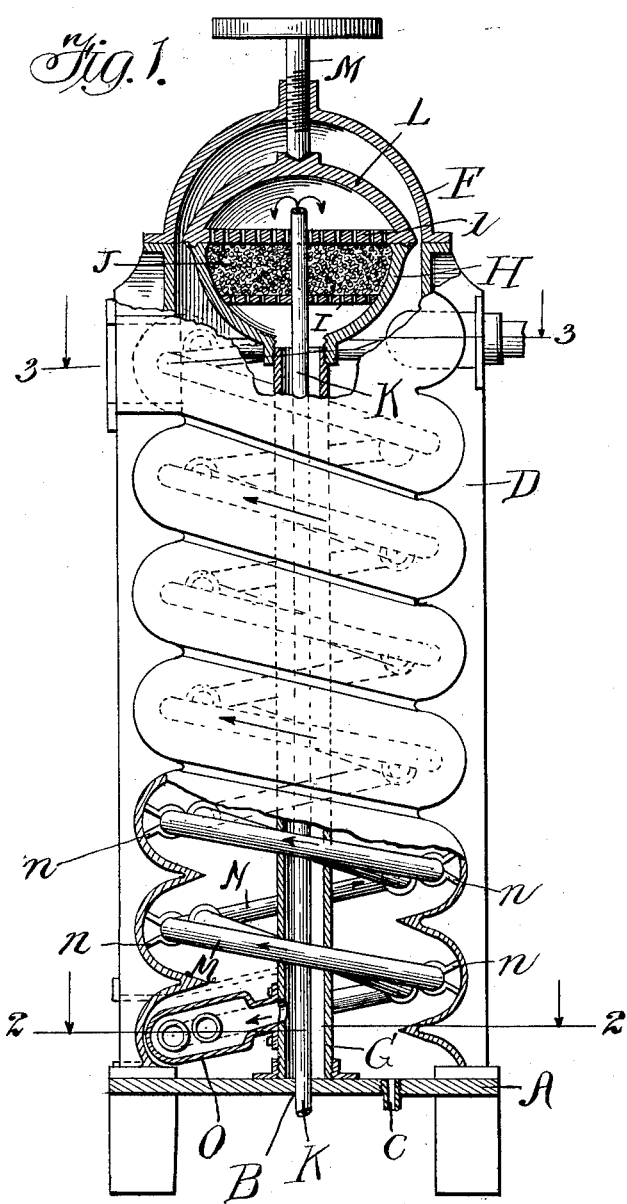

No. 756,417. PATENTED APR. 5, 1904.
E. H. SCHWARTZ.
FEED WATER HEATER.
APPLICATION FILED AUG. 3, 1903.
NO MODEL. 2 SHEETS—SHEET 2.
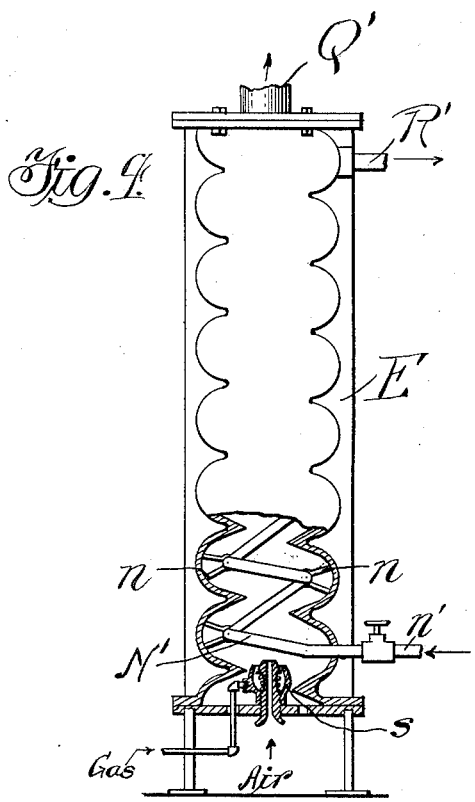
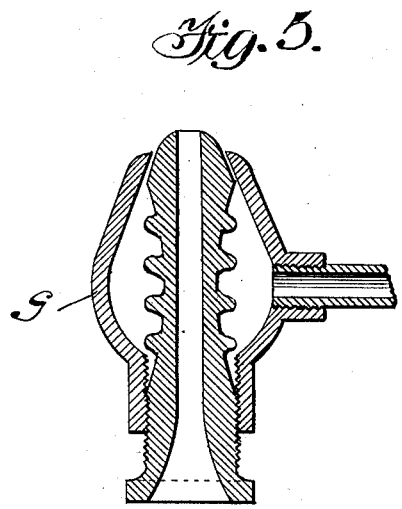
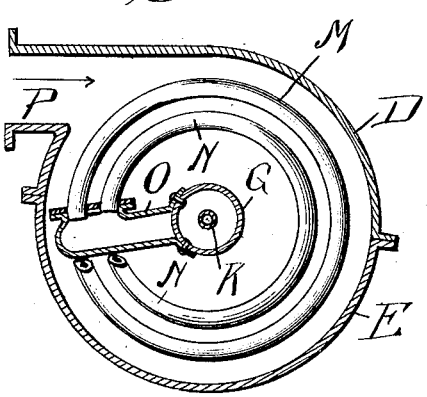
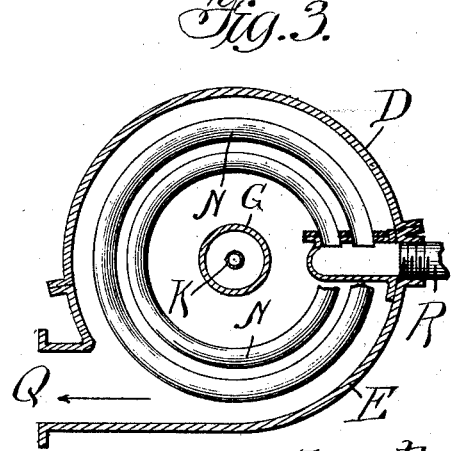
Witnesses:
Robert H. Weir
Edward G. Siefeldt
Inventor
Edward H. Schwartz
By Raymond and Barnett
attys.

No. 756,417. Patented April 5, 1904.

UNITED STATES PATENT OFFICE.

EDWARD H. SCHWARTZ, OF CHICAGO, ILLINOIS.

FEED-WATER HEATER.

SPECIFICATION forming part of Letters Patent No. 756,417, dated April 5, 1904.

Application filed August 3, 1903. Serial No. 168,037. (No model.)

*To all whom it may concern:*

Be it known that I, EDWARD H. SCHWARTZ, a citizen of the United States, residing at Chicago, in the county of Cook and State of Illinois, have invented certain new and useful Improvements in Feed-Water Heaters, of which the following is a specification.

My invention relates to improvements in water-heaters, and is especially adapted for use in utilizing exhaust-steam to heat the feed-water for boilers.

The object of my invention is to provide a simple, strong, inexpensive, and effective water-heater and to utilize the heat of the heating medium by prolonging the time during which the water to be heated is exposed to the heating influence thereof and by retarding the escape of the heating medium from the heater.

While in my preferred construction I utilize exhaust-steam as a heating medium, my heater is also adapted for use in domestic water-heating apparatus and in connection with gas or other similar burners which can be utilized to supply the heating medium.

These and such other objects as may hereinafter appear are attained by the devices shown in the accompanying drawings, in which—

Figure 1 shows an elevation of the preferred form of my heater with parts of the casing broken away. Fig. 2 is a sectional view on the line 2 2 of Fig. 1. Fig. 3 is a sectional plan view on the line 3 3 of Fig. 1. Fig. 4 is an elevation of a modified form of my device especially suitable for domestic use, the figure showing a part of the casing of the apparatus broken away; and Fig. 5 is a detail of the burner.

Like letters of reference indicate the same parts in the several figures of the drawings.

Referring by letter to the accompanying drawings, A is a base-plate upon which the heater is mounted and which is provided with a port B for the insertion of the cold-water pipe and with a suitable port C to provide for the drip or discharge of the water of condensation. Mounted upon the base A is the upright shell or casing of the apparatus, composed of the two members or halves D E, with a suitable cap F. These various members of the outer shell or casing are secured together by means of flanges and bolts in the familiar manner.

Mounted, preferably centrally, within the casing is an upright water-tube G, which is secured in any convenient manner to the base-plate A. The water-tube G carries upon its upper end a filter-chamber H, comprising a screen I, which carries the filtering material J. Extending through the port B and upwardly through the water-pipe G is a smaller water-inlet or feed-pipe K, which extends up through the filtering material J. The material within the filter is held in place by a cap L, comprising a screen $l$, and secured in place by a stem M, which is threaded into the cap-piece F.

The interior of the casing D E is spirally corrugated, as shown. Extending within the corrugations and rising spirally from the base to the top of the casing is a pair of coils M N, which connect at their base with a casting O, which leads to a discharge opening or port in or near the base of the central water-tube G. These coils are supported by suitable brackets $n$ or in any other suitable manner.

Opening tangentially into the base of the casing D and in line with the spiral corrugations on the inside of the casing is a steam-inlet port P, while opening out of the upper end of the casing or shell E, at the upper end of the internal spiral corrugations, is the steam-outlet port Q.

The twin coils N M follow the internal spiral corrugations of the casing, but discharge through the water-outlet port R.

The operation of the device so constructed is as follows: Water controlled in any suitable manner is admitted through the pipe K and rises through the pipe K and escapes into the interior of the cap L, whence it passes through the screen $l$, the filter J, and screen I downwardly through the tube G, thence through the casting O and around upwardly within the twin coils M N and out at the discharge-port R. Meanwhile steam is admitted through the tangential inlet P, and being so admitted tangentially it will tend to rise spirally within the casing D, this tendency being increased by the formation of the spiral corrugations on the interior of the casing, thereby prolonging the travel of the steam as it rises from the bottom to the top of the casing, and thereby prolonging the time during which the water within the various pipes is exposed to the heating of the steam and during which the heat of the steam is radiated into the water within the pipes and coils, the steam finally escaping through the exhaust-outlet Q.

In the modification shown in Fig. 4 I have simplified the structure by feeding the water directly into the coil N' through the inlet n' and out through the discharge port or outlet R', and I have used gas from the burner S as the heating medium, this burner being similar in construction to a burner shown in detail in a copending application by Charles Schwartz and being so constructed as to give the current or jet of flame as it passes from the burner a spirally-rotating movement, which movement is accentuated by the large internal spiral corrugation within the casing E', this construction also serving, as before, to retard the escape of the heating medium or to elongate its travel, so that more of its heat will be absorbed by the water within the coil N' than would be the case if the heating medium were allowed to pass directly upward through the casing and out through the vent Q'.

While I have shown one modified construction, it is obvious that many modifications can be made without departing from the spirit of my invention.

While in Fig. 4 I have disclosed one modified embodiment of my invention and in Fig. 5 I have disclosed a specific form of burner that is preferably used with such modified form, it should be understood that while I do not here claim specifically the structures described herein and shown in Figs. 4 and 5 I do reserve the right to cover said specific modified form and said specific form of burner by a separate application to be filed hereafter by me.

I claim—

1. In a water-heater, a casing provided interiorly with an upwardly-extending spiral corrugation, a water-coil disposed within said casing, and means for injecting a heating medium within said casing and for giving to said heating medium a spiral movement as it rises within said casing, substantially as described.

2. In a water-heater, the combination with a casing provided on its interior with a deep spiral corrugation extending upwardly within said casing, of a water-coil arranged adjacent to said corrugation, means for passing a current of water through said coil, and means for injecting a heating medium within said casing and around said coil, and for giving to said heating medium a spiral or gyrating motion as it rises within said casing.

3. In a water-heater, the combination with a casing, of a feed-water pipe extending lengthwise of said casing and discharging into a filter, a second water-pipe leading from said filter in a reverse direction within said casing, a coil connecting with said second water-pipe and extending upwardly within said casing, means for supplying a heating medium to the interior of said casing and around said coil, and means for giving an upwardly-gyrating movement to said heating medium.

4. In a water-heater, the combination with a base-plate, of an upright casing mounted thereon and provided with a deep interior and upwardly-extending spiral corrugation, a cap arranged to close the top of said casing, a feed-water pipe extending upwardly within said casing, a filter mounted adjacent to the upper end of said feed-water pipe, a second water-pipe extending downwardly from said filter but in communication with said first pipe through said filter, a coil extending upwardly within said casing and connecting adjacent to its lower end with said last-named water-pipe, means for injecting a heating medium within said casing and around said coil, and means for closing said filter against the entrance of said heating medium.

5. In a water-heater, the combination with the base-plate A, of the casing D, E, the cap F, the water-pipe G, the filter-chamber H, and cap L, the water-pipe K, the threaded stem M, and coils, M, N, the casing D, E being provided with the inlet-port P and outlet-port Q for the passage of a heating medium, and with the outlet-port R for the escape of the feed-water, substantially as described.

6. In a water-heater, a casing formed on its interior with an upwardly-extending spiral groove, water-containing means disposed within said casing, and means for supplying a heating medium to the interior of said casing, substantially as described.

7. In a water-heater, the combination with a casing, of means for supplying a heating medium tangentially to the interior of said casing, so as to give the same a spiral travel upwardly through said casing, and water-containing means disposed within said casing and exposed to the action of said heating medium.

8. In a water-heater, the combination with a casing provided with an upwardly-extending spiral groove, of a water-conduit disposed within said casing, and means for supplying a heating medium tangentially to said casing, so as to cause the same to travel spirally around said water-conduit and along said spiral groove.

9. In a water-heater, the combination with a casing of a water-coil disposed within said casing, and means arranged to conduct a heating medium tangentially to the interior of said casing and for conducting the same tangentially out of said casing in such a manner as to cause the same to travel spirally through said casing, substantially as described.

10. In a water-heater, the combination of a casing, a water-pipe extending longitudinally into said casing, a second pipe inclosing said first-named pipe and in communication with the interior thereof, a shell or casting connecting with said last-named water-pipe, a coil extending around said last-named water-pipe and within said casing and connecting with said casting, and means for supplying a heating medium to the interior of said casing.

EDWARD H. SCHWARTZ.

Witnesses:
F. H. DRURY,
M. E. SHIELDS.